A. E. SWOYER.
ATTACHMENT FOR CAMERAS.
APPLICATION FILED AUG. 20, 1910.
991,390.
Patented May 2, 1911.
2 SHEETS—SHEET 1.
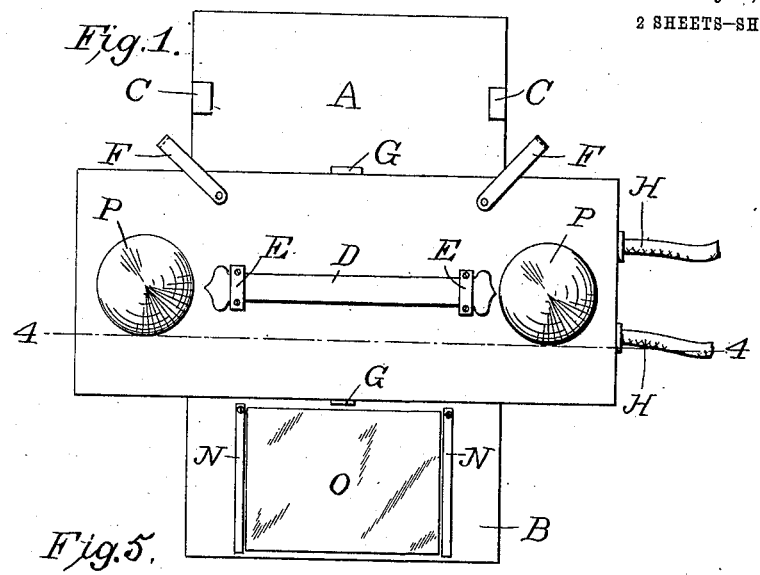
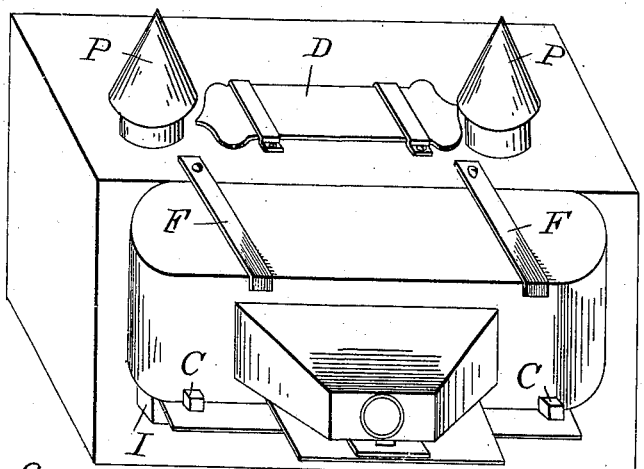
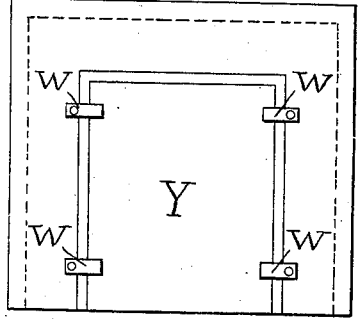
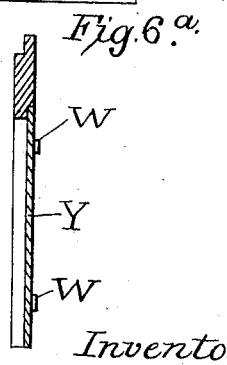
Inventor:
Alfred E. Swoyer,

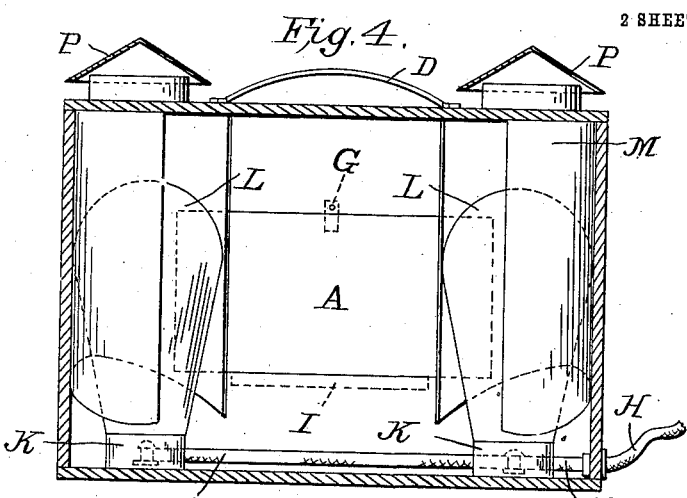
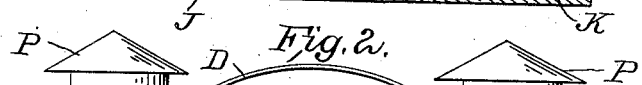
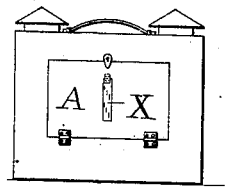
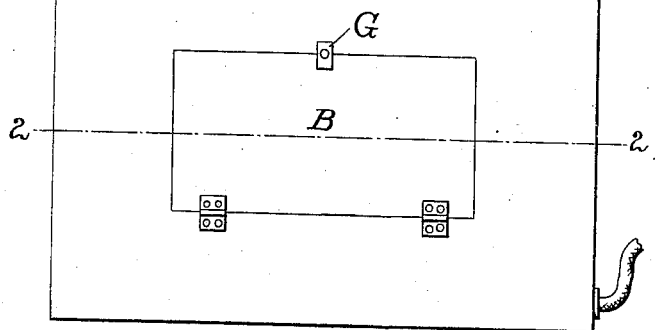
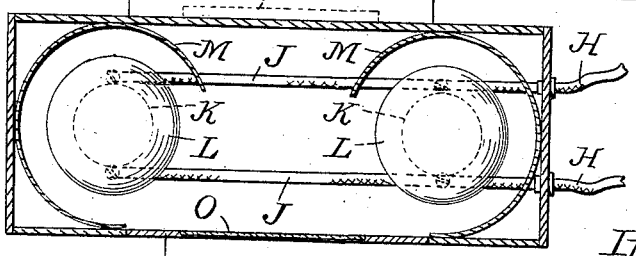

UNITED STATES PATENT OFFICE.

ALFRED E. SWOYER, OF PATERSON, NEW JERSEY.

ATTACHMENT FOR CAMERAS.

991,390.　　　　　Specification of Letters Patent.　　Patented May 2, 1911.

Application filed August 20, 1910. Serial No. 578,135.

*To all whom it may concern:*

Be it known that I, ALFRED E. SWOYER, a citizen of the United States, residing at Paterson, New Jersey, have invented certain new and useful Improvements in Attachments for Cameras, of which the following is a specification.

My invention relates to a portable folding attachment to be used in connection with cameras, and the invention consists in the features and combination and arrangement of parts hereinafter described, and particularly pointed out in the claims appended hereto.

In the accompanying drawings Figure 1 is a top view of said attachment with both hinged doors open; Fig. 2 is a rear view of the same with the door "B" closed; Fig. 3 is a horizontal section along the line 2—2 of Fig. 2; Fig. 4 is a vertical section along the line 4—4 of Fig. 1; Fig. 5 is a perspective of the apparatus with camera attached, and Fig. 6 is a plan, and 6ᴬ a section of the negative holder. Fig. 7 and Fig. 8 are views of a modification.

The invention as thus shown provides an apparatus with which in connection with any camera not of the types known as fixed focus and reflecting, the following objects may be accomplished: (1) The projection of the enlarged or reduced image of any opaque object of suitable size upon a screen. (2) The projection of transparent images (as glass positive or negative slides) enlarged or reduced upon a screen. (3) As a result of the above, opaque or transparent objects may be exhibited or photographic copies made upon sensitized paper or plates as follows:—Positive by the projection of light through a transparent negative. Negatives either by reflection from an opaque object or by the projection of light through a transparent positive. Any and all of the above processes may be performed without change in the apparatus save the insertion of a holder when transparent slides are used, as will be shown.

The essential idea of this invention is that the owner of any focusing camera other than one of the reflecting type as above noted, may perform any or all of the above operations without any change in the attachment or in the camera, save the insertion of the negative holder when transparent slides are used, these operations requir-
ing no other lens than that of the camera. To these ends the attachment is constructed with a suitable body of rectangular shape and constructed of wood or of sheet metal and provided with ventilators P—P, and two doors A and B, these doors being later described. The door A is hinged and arranged to fold and lock with the cleat G. Upon this door A are arranged two blocks C—C in such a position that the camera may be held by them firmly against the box proper when in the position shown in Fig. 5. Beneath the door A is placed the cleat I in such a position that when the door A is opened it will be supported at an angle of 90 degrees with the box. The door B, placed at the opposite side of the box and arranged to fit the rear opening tightly when closed and held by the cleat G, carries two spring card holders N for the support of cards or prints. On the door B is also arranged a mirror O let into the wood so as to be flush with the surface of the door B; the purpose of this mirror is to reflect the light thrown by the lamps through a transparent slide when such is used. When it is desired to project opaque objects or cards, they are slipped under the spring holders or clips N on the door B, covering the mirror. When it is desired to project transparent objects the mirror is left uncovered and the door B is closed; the slide is inserted in the holder (see Fig. 6) and the holder placed in the rear of the door A which has been opened and serves as a support for the camera. The lamps L—L are arranged in the corners of the box as shown, the arrangement as to the location being the same whether electricity or incandescent gas is the illuminant. In the latter case the usual gas connection is arranged instead of the wiring. These lamps L—L are held in the keyless rosette sockets K—K and connected in parallel across the terminals J—J. Back of each lamp is fitted a curved metal reflector M—M of such shape as to throw the maximum of light upon the card or mirror arranged on the door B and to protect any direct rays from the lamps L—L from shining through the lens of the camera; the backs of these reflectors should be covered with asbestos cloth or paper; should a wooden box be used, the whole should be lined with asbestos and painted black. The bushings through which the wires are led into the box should be of the usual insulating type. Upon the top of the box are arranged the clamps F—F, and the handle D, the latter serving to carry the outfit by. The clamps F—F, shown more fully in Fig. 5, are arranged to hold the camera, in connection with the cleats C—C firmly against the box. The holder shown in detail in Fig. 6 is rabbetted on three sides to fit into the opening left when door A is down, the bottom being squared to fit flush against the bottom of this opening. The glass plate Y is let into the opening in the holder, its face being flush with that of the holder; the cleats W—W are provided to hold transparent slides in position.

In operation where opaque objects are to be projected the camera (from which the detachable back has been removed) is fastened to the lowered door A by means of the cleats C and the clamps F, as shown in Fig. 5. The object is fastened under the spring clips N and the door B closed. The lights are then turned on—either from a wall switch or a simple snap switch attached to the box and not shown in the drawings, and the image focused by drawing the camera bellows in or out. When transparent slides are used the procedure is the same save that the mirror O in the door B is left uncovered and the slide holder with the slide attached is fitted in back of the door A and held in place with the cleat G usually used to fasten the door A.

In Figs. 7, and 8, I show another form of part of my invention in which, instead of using the cleat I as the means for supporting the door A when open, I may employ a brace X hinged to the door A to be folded into a recess in the face of the door, or to be set in the position of Fig. 8 to support the door when open.

I claim as my invention:

1. As an attachment for cameras a body or casing, means for attaching the same to the back of a camera, a source of light carried within the body or casing and a reflector substantially as described.

2. As an attachment for cameras a body or casing, means carried by the casing or body for attaching a camera thereto and a source of light and a reflector within the casing or body substantially as described.

3. As an attachment for cameras a body or casing to receive the back of the camera at its front side, said casing having a rear door, means thereon for holding an opaque subject, and a mirror carried by the door for reflecting the light through transparent objects substantially as described.

4. As an attachment for cameras a body or casing having a hinged front door to support the camera when open, and having a source of light and a reflector substantially as described.

5. As an attachment for cameras a body or casing having a hinged front door to support the camera when open, and having a source of light and a reflector and means for holding the camera on the opened front door substantially as described.

6. As an attachment for cameras a box or casing having a source of light and a reflector, doors on opposite sides of the casing, one for supporting the camera and the other carrying means for holding the object to be reflected substantially as described.

7. As an attachment for cameras a box or casing having doors on opposite sides and a source of light and a reflector, a transparent screen or plate at one door with means for holding the object at said screen, the other door having a mirror and means for attaching the box to a camera substantially as described.

8. An attachment for cameras having a casing a source of light and means for holding the object, said casing having an opening to register with the opening in the back of the camera substantially as described.

9. An attachment for a camera having a casing with a source of light and means to hold an object the image of which is to be projected with folding means for attachment to a camera substantially as described.

In testimony whereof, I affix my signature in presence of two witnesses.

ALFRED E. SWOYER.

Witnesses:
ROBT. M. DE FOSSELLE,
JOSEPH A. JOHNSON.

---

Copies of this patent may be obtained for five cents each, by addressing the "Commissioner of Patents, Washington, D. C."